(12) United States Patent
Ravindran et al.

(10) Patent No.: US 7,382,738 B2
(45) Date of Patent: Jun. 3, 2008

(54) METHOD AND APPARATUS FOR COMPUTING METRIC INFORMATION FOR ABSTRACTED NETWORK LINKS

(75) Inventors: Ravi Ravindran, Ottawa (CA); Peter Ashwood Smith, Hull (CA); Guo Qiang Wang, Kanata (CA); Hong Zhang, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 926 days.

(21) Appl. No.: 10/718,681

(22) Filed: Nov. 24, 2003

(65) Prior Publication Data

US 2005/0111375 A1 May 26, 2005

(51) Int. Cl.
*H04L 12/28* (2006.01)
(52) U.S. Cl. ..................... 370/254; 370/351
(58) Field of Classification Search .............. 370/229
See application file for complete search history.

(56) References Cited

U.S. PATENT DOCUMENTS

| | | | |
|---|---|---|---|
| 5,764,740 A | 6/1998 | Holender | 379/112 |
| 6,094,437 A | 7/2000 | Loehndorf, Jr. et al. | 370/420 |
| 6,104,699 A | 8/2000 | Holender et al. | 370/235 |
| 6,724,722 B1* | 4/2004 | Wang et al. | 370/229 |
| 6,791,949 B1* | 9/2004 | Ryu et al. | 370/254 |
| 2004/0228323 A1* | 11/2004 | Acharya et al. | 370/351 |
| 2005/0088978 A1* | 4/2005 | Zhang et al. | 370/254 |

OTHER PUBLICATIONS

Zheng Wang and Jon Crowcroft "Quality of Service Routing for Supporting Multimedia Applications", IEEE Journal on Selected Areas in Communications, vol. 14, No. 7, Sep. 1996, pp. 1228-1234.

\* cited by examiner

*Primary Examiner*—Creighton Smith
(74) *Attorney, Agent, or Firm*—Kent Daniels; Ogilvy Renault LLP (57) ABSTRACT

A method and apparatus for associating metric information with an abstracted link of an abstracted network map that includes certain network elements (NEs) of a data transport network involves computing routes through the data transport network between the NEs of the abstracted network map. The routes may be computed using the shortest widest path algorithm. The routes from an NE are exchanged with the other NEs of the abstracted network map, so that an edge NE receives the resource availability information of all optimal routes between pairs of NEs in the abstracted network map. The edge NE then transforms the resource availability of a corresponding optimal route into metric information of an abstracted link. The metric information is sent to a client associated with the abstracted network map to permit the client to make routing decisions.

20 Claims, 5 Drawing Sheets

METHOD AND APPARATUS FOR COMPUTING METRIC INFORMATION FOR ABSTRACTED NETWORK LINKS

CROSS-REFERENCE TO RELATED APPLICATIONS

This is the first application filed for the present invention.

MICROFICHE APPENDIX

Not Applicable.

TECHNICAL FIELD

The invention relates generally to abstracted network topologies, and in particular to a method and apparatus for computing link metric information for abstracted network links.

BACKGROUND OF THE INVENTION

Today's networks are formed of a number of network elements (NEs) interconnected by links (frequently optical fiber links). The links interconnecting the NEs may be arranged in one of a number of ways, resulting in various network topologies, such as ring, star, linear, and full-mesh topologies. It is also common for different autonomously managed subnetworks to be bridged to each other at various gateways, and for data transport services to be provided across the networks in a manner that is transparent to users.

Typically, data transport service provider networks serve client networks of limited geographic footprint, and the provider networks interconnect disparate client networks, generally providing longer haul data transport. In recent years for numerous reasons, including scalability, security, privacy, and simplicity of routing, provider networks have recognized value in presenting abstracted representations of their topologies to client NEs. For various reasons involving service level agreements and other contracts between managers of the data transport service providers and client networks, a current composition of the provider network, and numerous other factors, one of many possible abstracted network maps representing at least a few NEs of the provider network and a portion of the data transport capacity between the represented NEs, is created and disseminated to selected client network elements. Such an abstracted network map includes nodes representing corresponding NEs. Typically, only the NEs relevant to the client network are represented. For example, every edge provider NE (a NE of the provider network that is connected by a link to a client network NE) in the network may be represented. The abstracted network map may further include tandem network elements of the provider network, in order to reduce a number of links in the abstracted network map.

As noted, the reasons for presenting the abstracted view of the provider network include that many complicated details of allowable routes and network availability may be irrelevant to client NEs when determining routes, and to permit scalability of the provider network. The number of NEs represented in an abstracted network map is typically fewer than (and may be significantly fewer than) a number of NEs in the provider network. By presenting an abstracted network map with relatively few nodes and corresponding abstracted edges therebetween, searching and comparing available routes across the abstracted network maps becomes faster. In the foreseeable future there may be hundreds or thousands of PNEs in provider networks. The efficiency of using abstracted network maps is therefore becoming a necessity. Furthermore, only changes in network topology and connectivity that affect the NEs represented in the abstracted network map require changes in the corresponding abstracted network map. Other changes may require updating of metric information regarding abstracted links, but do not require changing the abstracted network map, which considerably facilitates changes in the configuration of the provider NEs.

Abstracted network maps may be associated with a route planning procedure that compensates for transmission level routing constraints such as those taught in co-pending co-assigned United States patent application entitled METHOD AND APPARATUS FOR DERIVING ALLOWABLE PATHS THROUGH A NETWORK WITH INTRANSITIVITY CONSTRAINTS filed Oct. 24, 2003 under Ser. No. 10/691,517, and United States patent application entitled METHOD AND APPARATUS FOR DERIVING OPTIMAL PATHS THROUGH A NETWORK SUBJECT TO A SUBSET SEQUENCE CONSTRAINT filed on Feb. 27, 2004 under Ser. No. 10/787,107. These and other route planning procedures (including some that are variations of Dijkstra's algorithm) require abstracted link metric information correctly associated with resource availability of the provider network, in order to correctly select optimal routes. However, no procedure for computing link metric information for abstracted network links (i.e. links in the abstract network map between NEs that may not be linked in the provider network, but rather represent a set of all available routes through the provider network between the represented NEs) is known.

Accordingly there remains a need for a method for computing metric information for abstracted links of an abstracted network map, the metric information corresponding to resource availability of an underlying network, so that the metric information can be used for route planning.

SUMMARY OF THE INVENTION

It is therefore an object of the invention to provide a method for computing metric information for abstracted links of an abstracted network map, the metric information corresponding to resource availability of an underlying network, so that the metric information can be used for route planning.

The invention therefore provides a method for assigning metric information to an abstracted link of an abstracted network map. The method comprises receiving from each network element (NE) of an underlying network represented in the abstracted network map, at least resource availability information associated with available routes between the NE and other NEs represented in the abstracted network map, the available routes being computed using local resource availability information related to physical links between the NEs in the underlying network; and transforming resource availability information associated with corresponding routes into metric information to be used by a client NE (CNE), respective metric information being associated with corresponding abstracted links that extend between two NEs that represent respective ends of the route.

The invention further provides a method for computing metric information for an abstracted link of an abstracted network map. The method comprises maintaining resource availability information regarding respective physical links of an underlying network at a network element (NE) in the abstracted network map; and using the resource availability information to construct a spanning tree rooted at a root node representing the NE, the tree being constructed by: iteratively expanding the tree to include a node adjacent to a instant node in the tree when a path from the root nodes to the adjacent node corresponds to a route of optimal resource availability over physical links between the NE and a second NE represented by the adjacent node, among all of the paths from the root node to nodes not in the tree.

The invention further provides a network element (NE) of a data transport network that is represented in an abstracted network map, in which the NE is interconnected to other NEs of the abstracted network map by respective abstracted links. The NE comprises a memory for storing a link state database including resource availability information relating to physical links in the data transport network; and a processor for constructing a spanning tree rooted at a root node representing the NE using the resource availability information, by iteratively expanding the tree from an instant node to include each node adjacent to the instant node in the tree when a path from the root node through the instant node to the node adjacent the instant node is a route of optimal resource availability with respect to physical links between the NE represented by the root node and a NE represented by the node adjacent to the instant node.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

The invention provides a method and system for associating metric information with abstracted links of an abstracted network map selectively representing an underlying data transport network. The metric information may be provided to client network elements (CNEs) so that the CNEs can request network paths through the provider network and beyond. The metric information is computed with respect to all routes in the data transport network between the NEs at opposite ends of the abstracted link. Corresponding resource availability information of an optimal one of these routes is identified using an adaptation of an algorithm known as the "shortest widest path" algorithm. The advantages of presenting such abstracted links to clients include that it greatly simplifies and expedites route selection by the client, and that it does not expose the topology of the data transport network to the client. Nonetheless the client can correctly determine available data transport capacity of the provider network as resource availability regarding the identified optimal routes is provided.

There is no requirement for client traffic to follow the optimal route computed by the shortest widest path algorithm that is used to produce the metric information for abstracted links, but rather such traffic may be routed internally using more complete (and possibly more current) information regarding the topology and availability of the data transport network. Accordingly the CNEs only identify paths through the provider network at a level of specificity determined by a degree of completeness of the abstracted network map. This is advantageous for permitting more efficient utilization of the provider network, which provides constrained internal routing between the NEs identified in the abstracted network maps.

Figures 1A, 1B:
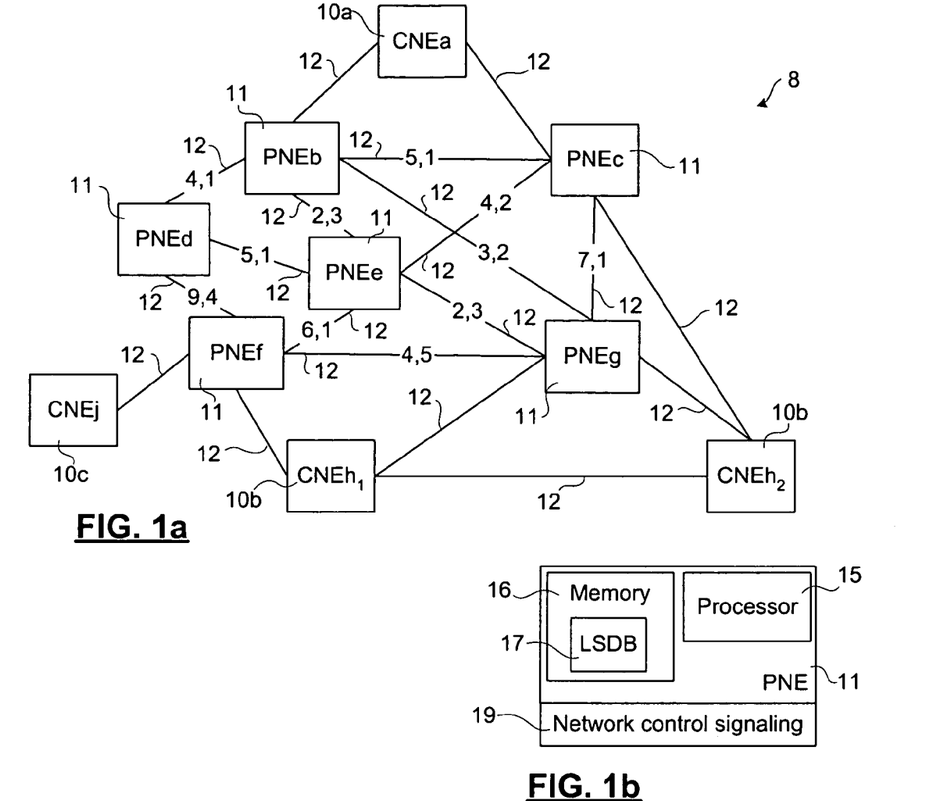
FIG. 1a is a schematic diagram illustrating a provider network having four edge NEs that are respectively connected to three client networks.
FIG. 1b schematically illustrates components of a provider network element for implementing in the present invention.

FIG. 1 schematically illustrates an example of a part of a data transport network 8 that includes a plurality of NEs, including CNEs 10, and PNEs 11, interconnected by bidirectional physical links 12. The PNEs 11 and CNEs 10 are identified by respective reference letters a-j. The physical links 12 may be pairs of optical fiber links respectively used for unidirectional data transport in opposite directions, or other transmission media. The PNEs 11 and physical links 12 that interconnect the PNEs 11 form a provider network, which is a proper subnetwork of the data transport network 8. In this example, the provider network borders on three client networks, a first of which includes CNEs 10, a second of which includes $CNEh_1$ 10, and $CNEh_2$ 10, and a third of which includes CNEj 10. Accordingly, physical links 12 between CNEs 10, and PNEb 11, interconnect the provider network with the first client network; physical links 12 between $CNEh_2$ and PNEc 11, and PNEf 11, and between $CNEh_1$ and PNEg 11 and PNEf 11, interconnect the provider network with the second client network; and a physical link 12 between CNEj 10 and PNEf 11 interconnects the third client network to the provider network. Accordingly, PNEs b,c,f,g 11 are termed "edge" PNEs, and all of the CNEs 10 are edge CNEs. The provider network serves to interconnect these client networks, and may further provide virtual private networks (VPNs) by allocating resources to client sites of the VPN, and providing routing tables for handling data therebetween in a manner well known in the art.

FIG. 1b schematically illustrates a component of a PNE 11 configured to implement to the invention. The PNEs 11 include hardware and software for switching, framing, and controlling data transmission for units of traffic that it handles, in accordance with an established protocol, in a manner well known in the art. Included in the hardware and software is at least one processor 15, and a content accessible memory 16. The processor 15, in the context of the present invention, is adapted to compute routes between the PNE 11 and other PNEs 11 using program instructions stored in the memory 16. One example of program instructions identify optimal resource availability routes, such as a procedure to be explained below with reference to FIG. 3.

In order to select the routes in accordance with constraints on the physical network, resource availability information is exchanged with the other PNEs using a network control signaling system 19, which, in many cases, employs a predefined port of data transport capacity of the physical links 12. The resource availability information relates to particular physical links 12 and indicates current resource availability of the physical links 12. For example, any of: a bandwidth availability, a cost of using the physical link 12, a probability of loss, a delay or a delay jitter induced by the use of the physical link, a signal degradation value, and other resource availability parameters may be included in the resource availability information with an identifier of the two PNEs that subtend the physical link 12, depending on a type and configuration of the particular network. Each PNE 11 stores its most current resource availability information for each of the physical links 12 identified in the provider network in a link state database 17 (LSDB).

Figure 2A:
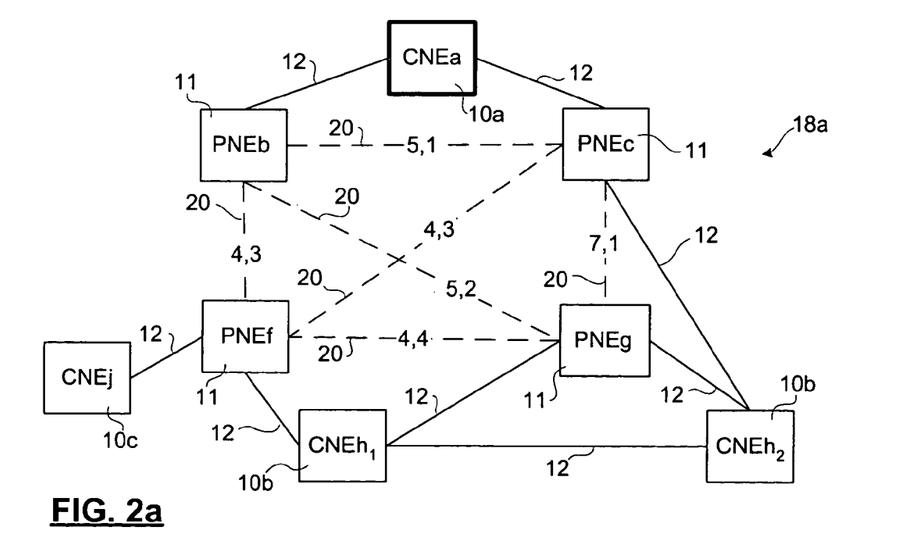
FIGS. 2a, 2b, and 2c schematically illustrate three abstracted network maps of the provider network presented to a respective one of the client networks.

It will be appreciated by those skilled in the art that the provider network shown in FIG. 1a is much simpler than many current provider networks, which have many PNEs 11. Even given this simple example, there are numerous different abstracted network maps that can be provided to the edge CNEs 10. Three examples of abstracted network maps that may be provided to client networks are illustrated in FIGS. 2a,b,c respectively. Such abstracted network maps provide a respective subset of routing options to the client network depicting abstracted network links between the PNEs.

FIG. 2a schematically illustrates a first abstracted network map 18a presented to CNEs, which is associated with the first client network. The first abstracted network map 18a shows a provider network that includes all edge PNEs full-mesh connected by abstracted links 20. The abstracted links 20 do not correspond directly to any physical links. So for example, even though there is a physical link 12 that interconnects PNEb to PNEc that physical link 12 is only one route between PNEb and PNEc, and the corresponding abstracted link 20 represents all of the routes, in the following sense: traffic sent over a network path that is chosen by a CNE and includes the abstracted link 20, may follow any of the physical routes between the two PNEs. At the same time, in a different sense, the abstracted link 20 may be said to represents current (preferably optimal) route between the identified PNEs, in that the resource availability parameters are ascribed to the abstracted link 20.

The full-mesh interconnection is an efficient representation if the provider network offers connections to all three of the client networks, and there are relatively few edge PNEs that are substantially equidistant. Equidistant in this content means a measure of the cost of using network resources required to interconnect NEs. If there are hundreds of edge NEs tens of thousands of abstracted links 20 are required for a full-mesh connection, in accordance with the equation L=n(n−1)/2 (L is the number of links, n is the number of edge NEs). One advantage of a full-mesh connected abstracted network map such as abstracted network map 18a is that a minimum of information about the internal structure of the network is provided, and a maximum of flexibility may be retained by the provider network for selecting internal routes.

Figure 2B:
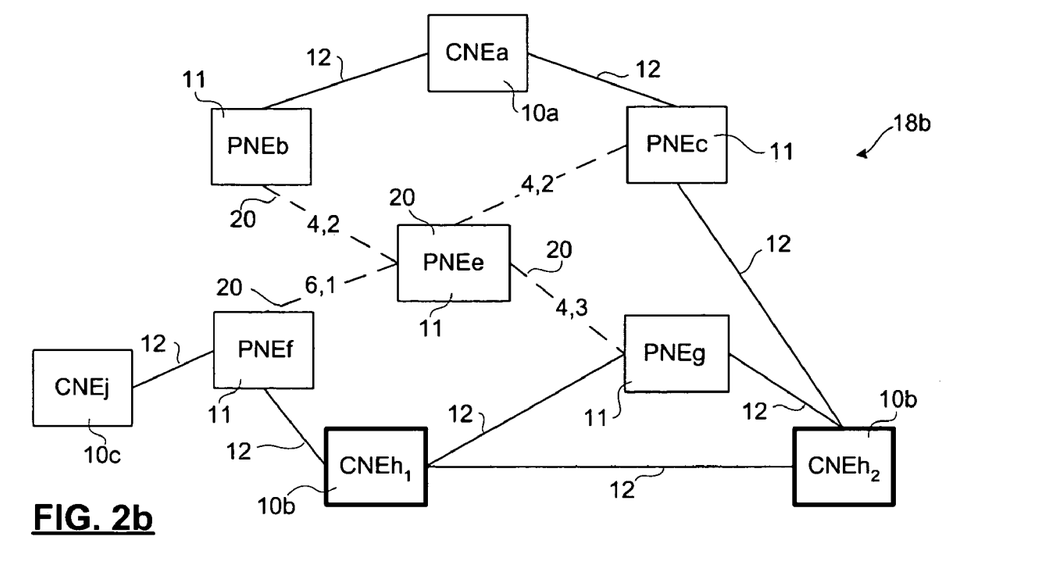

An abstracted network map 18b schematically illustrated in FIG. 2b shows a hub and spoke configuration of the PNEs. The abstracted network map 18b is provided to the second client. The hub is PNEe, which is connected by abstract links 20 to each of the edge PNEs. The hub and spoke configuration reduces the number of abstracted links 20 required (from n(n−1)/2 to n) as compared with the full-mesh configuration, which permits the provider network to scale.

Figure 2C:
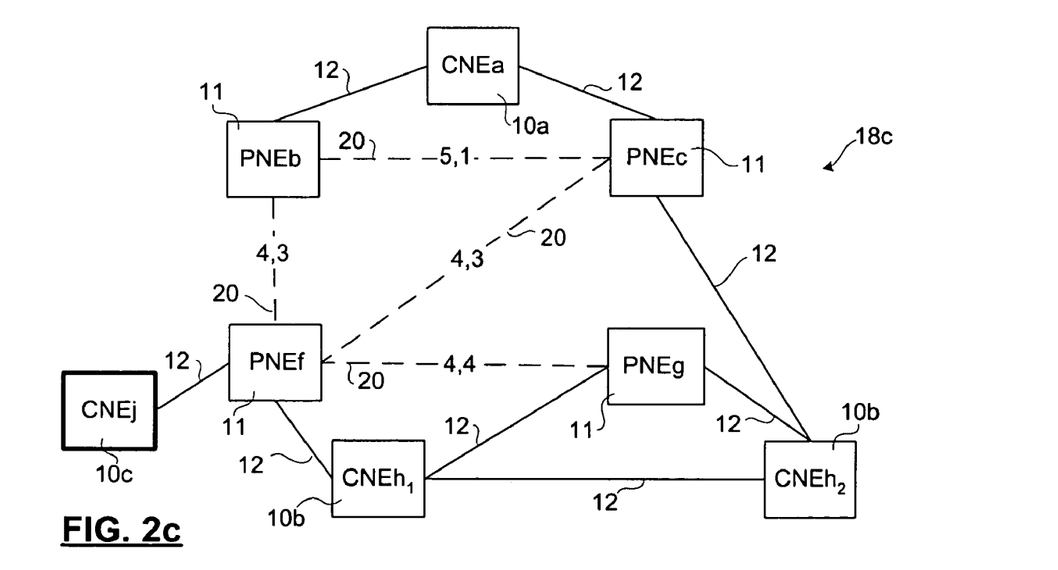

FIG. 2c shows a third abstract network map 18b including abstracted links 20 between selected pairs of the edge PNEs. Specifically there is an abstracted link 20 connecting PNEf to each of the other edge PNEs, and further there is an abstracted link 20 connecting PNEb and PNEc. Such a network map may be presented by the provider network for any number of reasons to encourage/discourage use of certain network resources. It is worth noting that although there is no abstracted link 20 between PNEc and PNEg in the abstracted network map 18b, this does not preclude other abstracted links 20 from representing resource availability from a physical link 12 between PNEc and PNEg.

Figure 3:
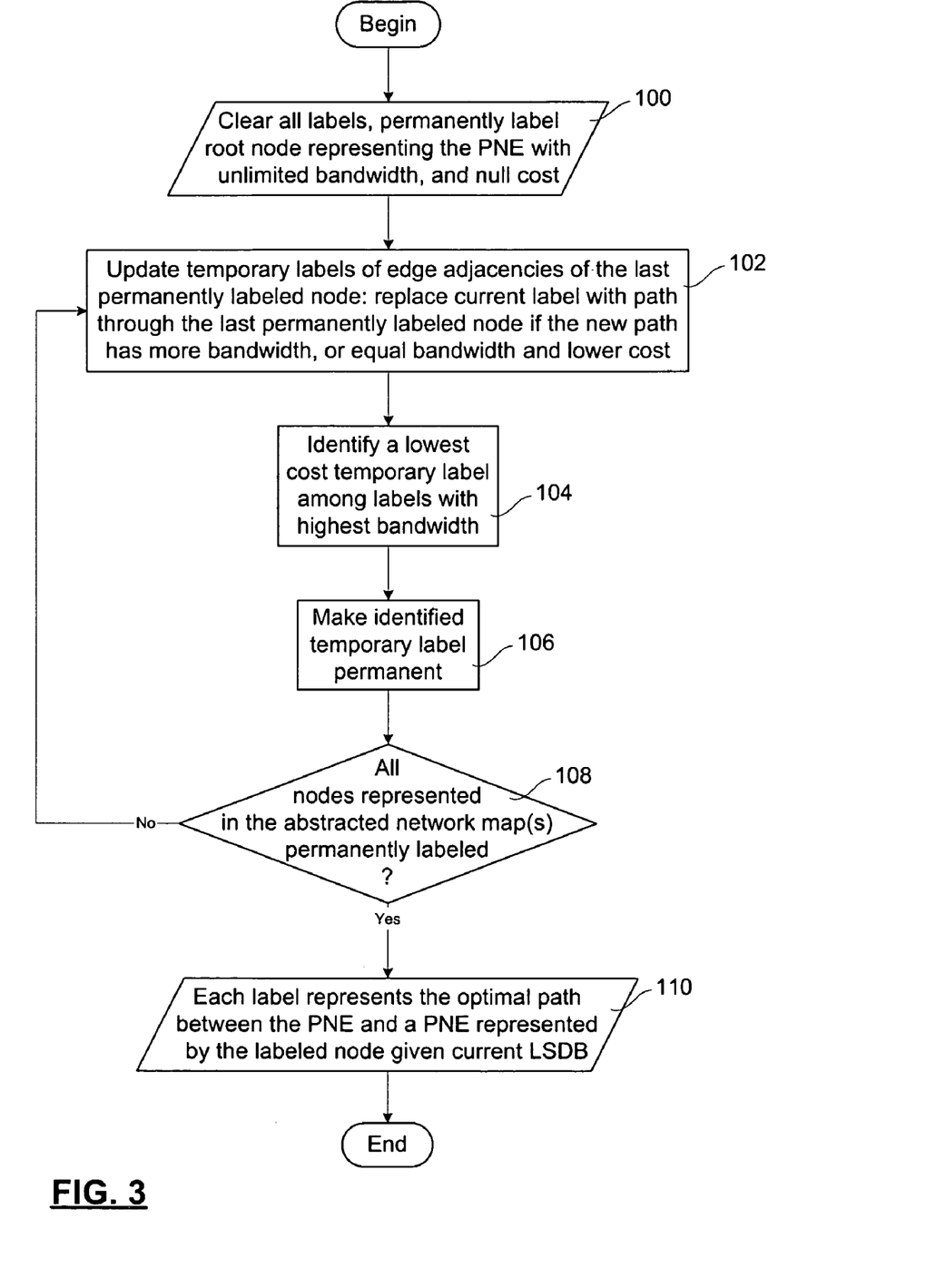
FIG. 3 is a flow chart illustrating principal steps involved in a procedure for computing metric information associated with an abstracted link.

FIG. 3 shows principal steps in a procedure for computing metric information for an abstracted link between a PNE represented in an abstracted network map, and all other PNEs represented in the abstract network map using resource availability information relating to physical links of the provider network available at the PNE. The process is related to an algorithm known in the art as the shortest widest path algorithm taught by Zhang Wang and Jon Crowcroft in a paper entitled Quality-of-Service Routing for Supporting Multimedia Applications published in IEEE Journal on Selected Areas in Communications, Volume 14, No. 7, September 1996, pp. 1228-1234. In general the shortest widest path algorithm is one of many adaptations of Dijkstra's algorithm which constructs a tree to span a graph. The tree is constructed by iteratively expanding a tree rooted at a root node of the graph to a node adjacent to an instant node in the tree when a path from the root node to the adjacent node through the instant node corresponds to an optimal route in the network represented by the graph, as defined by a selected algorithm. In accordance with the shortest widest path algorithm, the optimal path corresponds to a route of optimal resource availability over physical links between the PNE represented by the root node, and a second NE represented by the node adjacent to the instant node in the tree.

It should be noted that the term "path" has a dual meaning as used in this document. In the present document, a path is a string of edge connected nodes in a graph (or a tree defined thereover), and a network path is a conduit for data established (or being established) through a data transport network that may traverse numerous provider and/or client networks. Accordingly a network path requires selection of a route, the route being chosen with respect to metric information supplied by paths selected in graphs representing the provider network(s). The route chosen for a network path within the provider network is controlled by the PNEs, and the route need not be a provisioned path.

The procedure produces paths through a graph having optimized resource availability information, in accordance with a two tier optimization. When the procedure is complete, each node (representing a corresponding PNE) is labeled with a path between a root node representing a first PNE, and a node with a label. The path corresponds to a route between the first PNE and another PNE represented by the labeled node. The route has optimal resource availability among the routes in the provider network between the first PNE and the other PNE. More specifically, the route is optimized first for a primary availability parameter, and among the optimal paths with respect to the primary availability parameter, the path is further optimized with respect to a secondary availability parameter.

There are numerous types of resource availability parameters that may be used. A most frequently used parameter is bandwidth available for transport over a link. The bandwidth availability parameter is an example of a convex parameter, as it is the minimum of the bandwidth availabilities of the links in a path that determines the bandwidth availability for the entire path. Delay and cost are two examples of parameters that are additive in that the delay/cost of a path is the sum of the delays/costs of the links in the path. Other parameters may have other operations for aggregation (e.g. a loss probability may be modeled as a multiplicative parameter). The cost of using a link resource may be assigned a unitary value in some networks, and bandwidth may be the optimized parameter. These are assumptions frequently made, and explains the name of the algorithm "shortest widest path". The "widest" path is path with highest available bandwidth, and the shortest (herein more generally called the lowest cost) path is a least costly of the widest paths, but may not correspond to the absolutely lowest cost path available between the first PNE and another PNE. However, if a lower cost path is available, the shorter path offers less bandwidth than the labeled path.

The procedure shown in FIG. 3 is applied at the PNE that uses the LSDB 17 to create a topological map (i.e. a graph showing connectivity) of the provider network. The procedure begins by initializing memory (step 100) for storing labels. The root node representing the PNE is permanently labeled with a label having a path including only the root node. The path is assigned unlimited bandwidth and a null cost.

In step 102, temporary labels of nodes adjacent to the most recently permanently labeled node are updated. Updating a label involves labeling the adjacent node if it is unlabeled with a new path that is formed by extending the path from the permanently labeled node to the adjacent node. Otherwise a prior label (having a prior path, cost and bandwidth) is compared with the new path. The new path has a bandwidth availability equal to a minimum of the bandwidth availability of the permanent label, and a bandwidth availability of a physical link associated with an edge between the permanently labeled node and the adjacent node representing the physical link. If a current path of an existing label of the adjacent node is of a lower bandwidth than that of the new path, or the bandwidths of the two paths are equal and the new path has a lower cost than the current path, the current label is replaced by a label that includes the new path (the path of the last permanently labeled node with the adjacent node appended), and the bandwidth and cost of the new path.

At the conclusion of step 102, a new set of temporary labels are stored and the procedure identifies temporary labels having a highest bandwidth availability. A label with a lowest cost is chosen (step 104) from among those labels with highest bandwidth availability. The chosen label is made permanent (step 106), and then it is determined whether all PNEs in the abstracted network map are permanently labeled (step 108). If a node representing a PNE in an abstracted network map is not permanently labeled, the procedure returns to step 102. Otherwise the procedure ends. The procedure therefore ends after each PNE label is permanent, or at least when each PNE represented in the abstracted network map is permanently labeled. Each node that is connected to the PNE by an abstracted link obtains a label in this procedure; and each of the nodes corresponds to a respective PNE in the provider network. The permanent labels of the nodes represent least cost, highest bandwidth routes from the PNE to a PNE represented by the node bearing the label, as indicated in step 110.

An example of this procedure may be illustrative. The PNEs shown in FIG. 1 are interconnected by physical links 12 that are associated with two numbers, a number of units of bandwidth available, and a cost (1 . . . 5) of using the bandwidth. A first example of the procedure for computing the metric information is applied at PNEb. Assuming these are the weights of the provider network adjacencies contained in the LSDB 17 at PNEb, and the PNEb is directed to compute all of the paths between the four edge PNEs (i.e., the four PNEs contained in the abstracted network map 18a), the procedure would find the metric information assigned to the abstracted links 20 shown in FIG. 2a.

Initially the nodes of a graph (representing respective PNEs) are all unlabeled. A node b representing PNEb is permanently labeled with the initial label that provides a path containing only b, and has null cost and unlimited bandwidth. The edges of the graph correspond to physical links 12, and are associated with resource availability information of the physical links 12, accordingly.

Once the label for node b is made permanent, each (non-permanently labeled) node that is adjacent to b (i.e. c,d,e,g) is temporarily labeled. The paths of the corresponding labels are bc, bd, be, and bg, respectively and their costs (1,1,3,2, respectively) and bandwidths (5,4,2,3, respectively) are simply those of the corresponding resource availability of physical links the graph edges represent, as determined using the LSDB 17. The procedure advances to a step of evaluating the temporarily labeled nodes. Of these four labels, the label at node c is of a highest bandwidth. Accordingly in a next iteration label c is made permanent, and the non=permanently labeled edge adjacencies to c (e,g), are updated. Updating in this case involves replacing the label of g, currently having three units of bandwidth, to include a path bcg, a bandwidth of 5, and a cost of 2 (abbreviated herein bdg,5,2). Likewise the label of e is changed from be,2,3 to a higher bandwidth path bce,4,3.

The temporary label with the highest bandwidth (5) is now that of node g. From permanently labeled node g, f is given a temporary label bcgf,4,7, but e is not relabeled, as edge ge is associated with only 2 units of bandwidth, and the current label of e (bce,4,3) has 4 units. There are now temporary labels at d, e, and f that have bandwidth=4. The label at d is of a least cost among these, and accordingly is chosen and made permanent. Both labels of adjacencies e,f are changed (to bde,4,2, and bdf,4,5, respectively) as the bandwidths of the new paths (through d) are equal, but the costs (2,5 respectively) are less than those of the current paths (through c and g respectively). Node e is subsequently made permanent because it has a lowest cost of 2. Node f is then relabeled again with a cost of 3, bandwidth of 4, and a path bdef. There are no more nodes in the graph, and so once the label at node f is made permanent, all of the nodes representing the PNEs represented in the abstracted network map (i.e. the edge PNEs: PNEb, PNEc, PNEf, and PNEg) are also permanently labeled, and the procedure ends.

The labels at nodes c,f and g can then be used to provide metric information for corresponding abstracted links 20 between PNEb and PNEc, PNEf and PNEg, respectively. Specifically the metric information may be derived by applying a transformation on the metric information. Such a transformation may be applied, for example, to offer a percentage of the available bandwidth to the client network, or to present the bandwidth or other resource availability information in units or a format expected by the CNE that receives the update. Preferably only the information required by the CNE is forwarded in a metric information update message, and only metric information that has changed with respect to a current/previous value associated with a particular abstracted link is sent to the corresponding CNE. The metric information update messages may be exchanged by the network control signaling system 19.

It will be recognized that this procedure provides metric information for only half of the abstracted links 20 in FIG. 2a. Furthermore, if the abstracted links 20 are bidirectional, and the network resource availability is not symmetric, only a quarter of the relevant link metric information is obtained by the procedure applied at a single PNE. In accordance with a preferred embodiment of the invention, all of the other PNEs that are in the abstracted network map also perform the same procedure. Accordingly PNEc computes the highest resource availability, least cost paths to PNEb (cb,5,1), PNEg (cg,7,1) and PNEf (cef,4,3). Similarly when other PNEg or PNEf applies the procedure, a path is found (fecg,4,4) that relates to the abstracted link 20 between PNEf and PNEg. It will be noted that paths between xy and yx are invariably the same with this method as symmetric link availability is assumed. If this assumption is not valid on a given network, the provider network topology would consist of a directed graph having edges associated with respective unidirectional links between the PNEs, and a directed graph version of the above noted procedure is applied.

The PNEs that are represented in an abstracted network map exchange the locally computed resource availability information of the optimal paths with each other so that respective edge PNEs (PNEb and PNEC) can forward metric information relating to all of the abstracted links 20 in the abstracted network map 18a to the CNEs. The preferred process for maintaining the metric information is therefore a distributed procedure that is performed in parallel by all of the PNEs in the abstracted network map or by all of the PNEs in any of a plurality of abstracted network maps. The transmission may be analogous to a well known procedure for flooding physical link resource availability information to the PNEs, in order to maintain the LSDB 17.

The PNEb, and PNEc are also represented in other abstracted network maps (i.e. 18b,18c), and accordingly the resource availability information of optimal paths between pairs of PNEs that are interconnected by abstracted links is also exchanged. The permanent labels between nodes representing PNEb and PNEc, PNEe, PNEf, and PNEg are therefore forwarded to corresponding members of the other abstracted network maps 18b,18c. The results of the above procedure are used to provide metric information to all of CNEs to which the resource availability information is relevant. Each abstracted network map 18 may be handled by a respective autonomous process, or all of the abstracted network maps 18 may be computed simultaneously. It may be efficient for resource availability information of optimal paths related to corresponding abstracted links to be sent only once to all of the PNEs in all of the abstracted network maps (or all of these that are connected by a link 12 to a CNE), so that the recipients of the changed resource availability information can decide which (if any) of the optimal paths relate to the abstracted links it offers a corresponding client.

In FIG. 2b the resource availability information shown as weights of corresponding abstracted links 20 could all have been computed by applying the procedure of FIG. 3 at PNEe. The resulting optimal paths between a node e representing PNEe, and nodes b,c,f, and g are edb, ec, ef, and ecg, respectively. The weights shown in FIG. 2c are computed as previously described by PNEb, PNEc, and PNEf or PNEg.

Figure 4:
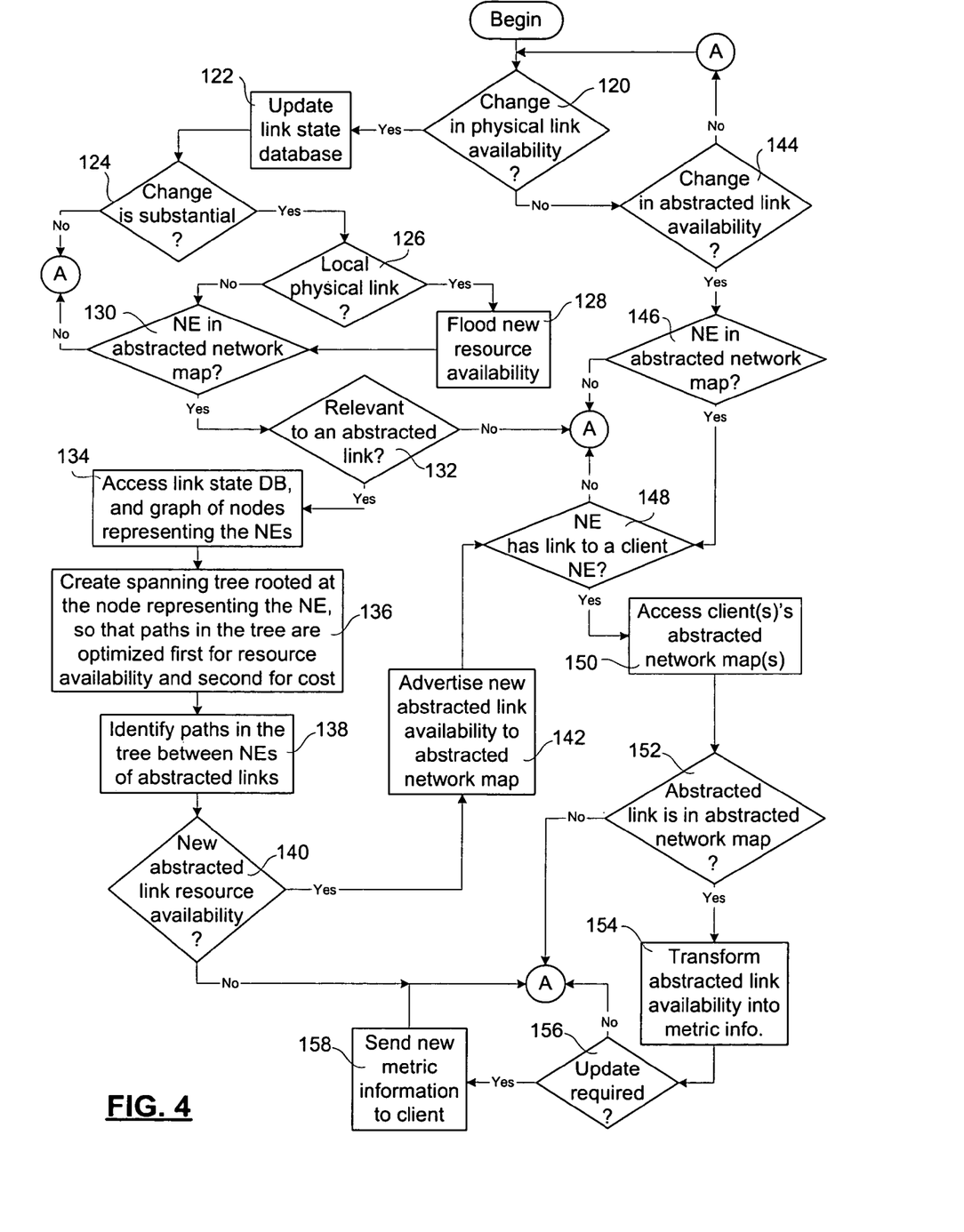
FIG. 4 is a flow chart illustrating principal steps involved in a distributed process for providing metric information related to an abstracted link in an abstracted network map, in accordance with an embodiment of the invention.

FIG. 4 illustrates principal steps involved in a distributed process for maintaining the metric information associated with abstracted links. The process is one of many ongoing processes that continue while the network is operational. In a manner well known in the art, each PNE (and for that matter each NE in the data transport network) is responsible for monitoring adjacent links, and determining current local resource availability. Many constraint-based routing systems are known to rely on the flooding of such local resource availability information, and some such systems (including internal gateway protocols) have been standardized (e.g. intermediate system to intermediate system (ISIS), open shortest path first (OSPF), and private network to node interface (PNNI)). The present invention is not in any way tied to any particular signaling system, format or protocol, and can be implemented using various systems for exchanging local resource availability information. Furthermore the method of computing metric information for a link can be applied in a centralized (or less distributed) manner by a single processor which iterates the process below for each PNE as required. One embodiment of the centralized application of the invention is to enable an edge PNE that is edge connected to a client to compute all of the relevant optimal paths using its LSDB 17, and to control the information presented to the CNE. If the client is a virtual private network having a plurality of edge CNEs (usually called "sites") either each edge PNE directly connected to a site computes all of the optimal paths by multiple iteration of the above-described procedure, or each site computes optimal paths to the abstracted link connected PNEs, and exchanges these in a distributed process.

In step 120, it is determined whether the PNE performing the procedure has been alerted to a change in physical link availability. The PNE is notified of a change if it is connected to a link that has a change in its resource availability, or it has received a message from another PNE indicating a change in a remote link's resource availability. If a local change in resource availability is found, the PNE updates its LSDB (step 122), and determines whether the change in availability is substantial (step 124). If the change is insubstantial, the procedure returns to step 120. Otherwise it is determined whether the changed physical link is local or remote (step 126). If the physical link that has changed resource availability information is local, and the change is substantial, the PNE floods the new resource availability information to all other PNEs of the provider network (step 128) so that the LSDBs of the other PNEs can be kept current.

In either case the process advances to step 130 where it is determined whether the PNE is represented in an abstracted network map. If the PNE is not represented in any abstracted network map, the process returns to step 120. Otherwise, in step 132, it is determined if the changed resource availability information is relevant to an abstracted link of (one or more of) the abstracted network map(s). In accordance with an embodiment of the invention, a change in resource availability information is subjected to a simple test to determine if it could result in a change in the resource availability of a current optimal path. For example, if a decrease in resource availability related to a link that is not in any of the optimal paths related to abstracted links, there is no need to recompute the optimal paths which will not have changed. More elaborate tests involving tracked information stored during a previous application of step 136 may be applied to more accurately determine whether the execution of steps 134-140 is necessary. If the change is not relevant to any abstracted link, the process returns to step 120. Otherwise the PNE applies a procedure such as described above with reference to FIG. 3.

In step 134, the PNE accesses its LSDB and identifies a graph of nodes representing the PNEs of the provider network. The graph is also called a topological map, and a topology of the provider network, which is contained in the LSDB 17. A spanning tree is constructed starting at a root node in the graph representing the PNE (step 136). The tree is expanded in accordance with a rule that ensures that paths in the tree have optimal resource availability. Preferably the paths are secondarily optimized for cost. It should be clear that any two or more parameters (aggregated convexly, additively, or otherwise) can be used in accordance with the procedure shown in FIG. 3.

Once the tree spans all of the other PNEs in the abstracted network map(s) to which the PNE belongs, the PNE identifies the paths in the tree between the PNEs interconnected by abstracted links (step 138) of the abstracted network maps. If the resource availability information related to the abstracted links are the same as the results of a previous application of steps 134-138 (as determined in step 140), the process returns to step 120. Otherwise the changed resource availability information related to corresponding abstracted links are advertised to all of the other PNEs in the (corresponding) abstracted network map(s) (step 142).

It will be evident to those skilled in the art that each abstracted network map may be separately treated by respective processing modules, resulting in multiple messages, sometimes even between the same PNEs regarding the same set of optimal paths, because they relate to abstracted links in different abstracted network maps. These messages may be compounded or concatenated depending on protocol formats used for signaling. Alternatively the abstracted links may be defined independently of the abstracted network maps so that the abstracted link availability information is not tied to a particular abstracted network map, and can be exchanged with all PNEs in all the abstracted network maps. A further control layer may be added to ensure that only the PNEs of the abstracted network maps that include the abstracted link, are sent the message.

If it is determined in step 120 that there has been no change in physical link availability, the process advances to step 144 wherein it is determined whether or not the PNE has received a message indicating that resource availability related to an abstracted link has changed. If no change in abstracted links or physical links have been identified, the process returns to step 120. Otherwise, in step 146, it is determined whether the PNE is in an abstracted network map. If the PNE is not in an abstracted network map, the process returns to step 120. Otherwise the process advances to step 148.

If a change in the availability of an abstracted link in an abstracted network map is found, either by recomputing optimal paths (via step 140), or by receiving a change from another PNE in the abstracted network map (via step 146), in step 148, the PNE determines whether it is an edge PNE of the provider network. If the PNE is not an edge PNE, the process returns to step 120. Otherwise a set of abstracted network maps of clients that are directly connected to the PNE are accessed, in step 150. It is then determined (step 152) whether the abstracted link that has new resource availability information is in one or more of the client abstracted network maps. If none of the PNE's client abstracted network maps includes the changed abstracted link, the process returns to step 120. Otherwise the abstracted link availability information is transformed into corresponding metric information that can be used by a corresponding client for routing purposes (step 154). The PNE determines whether the metric information needs to be updated (step 156), and if so, sends the new metric information to the corresponding client. It may happen that the PNE (an edge PNE) is directly connected to a plurality of CNEs, and accordingly may send a plurality of new metric information updates to respective CNEs. Moreover, if multiple clients access the provider network via a same CNE, the edge PNE may issue multiple updates to the same CNE. The procedure finally returns to step 120.

Figure 5:
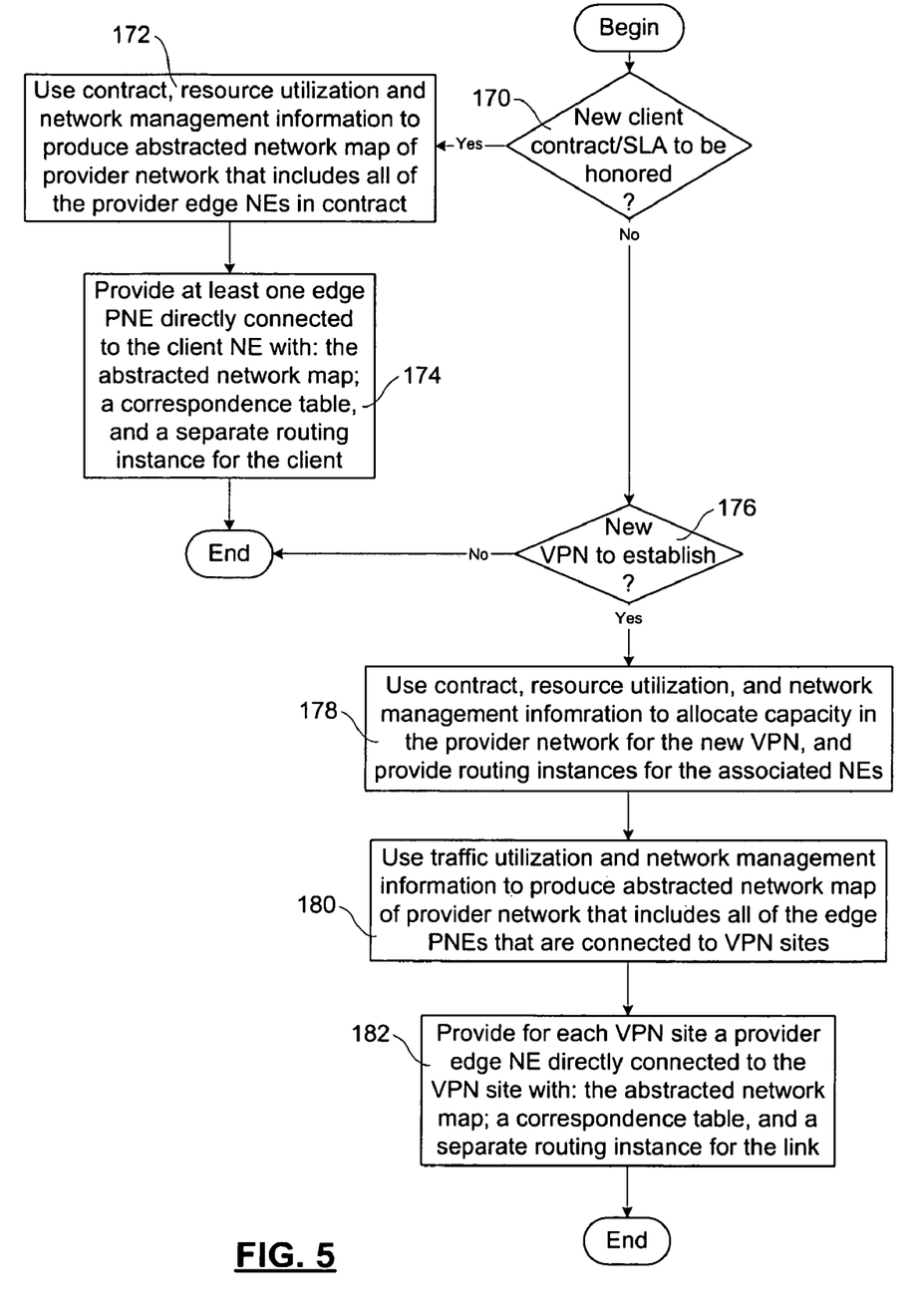
FIG. 5 is a flow chart illustrating principal steps involved in a process for provisioning a client NE with routing capability over a provider network.

FIG. 5 illustrates principal steps involved in enabling a client to apply route planning procedures over abstracted links of a provider network. In step 170, it is determined whether a new service level agreement (SLA) or client contract is to be honored. If a new contract is to be honored, the process involves producing the abstracted network map (step 172) that includes all of the edge PNEs with which the client requires a connection. Network management may apply various decision making tools in order to select the PNEs and abstracted links using network management information such as patterns of resource utilization, the terms of the contract, including a reliability of service, etc. The abstracted network map is forwarded to at least one edge PNE (step 174) that is directly connected to an edge CNE of the client network used for the purposes of the contract. The edge PNE is provided with a separate routing instance for the client, or alternatively instructions for controlling the forwarding of metric information is provided to the edge PNE. The edge PNE is further provided with instructions for transforming the abstracted link availability information into corresponding metric information. Preferably all of the PNEs in the abstracted network map are provided with instructions for computing the optimal paths between the PNEs of the abstracted network map, and for communicating those to the other PNEs in the abstracted network map. The process of FIG. 4 can then be applied to provide the client with corresponding metric information, and the process for enabling is complete.

If in step 170 it is determined that there is no new client or SLA to be honored, it is determined (in step 176) whether a VPN is to be established over the provider network. In the context of the present invention, an abstracted network map is set up for the VPN using a contract and network management information, to assign bandwidth capacity of corresponding physical links to the new VPN. Each PNE connected to a physical link with bandwidth capacity assigned to the new VPN is provided with required routing tables and handling instructions, in a manner well known in the art. The network management, in step 180, produces the abstracted network map that includes all of edge PNEs that are directly connected to VPN sites. The abstracted network map does not need to include representatives of substantially all of the physical links that have some assigned bandwidth. The difference between the allocated bandwidth resources and the abstracted network map permit simplified routing through the VPN, while permitting more efficient provider network handling of the traffic.

It will be understood by those skilled in the art that the assignment of bandwidth can be oversubscribed (more than 100% of the bandwidth on a physical link may be assigned to various VPNs) permitting an effective statistical multiplexing of traffic over the network, which results in higher utilization of the network and potentially higher revenues. The use of abstracted network maps therefore constitutes an advance over the prior art use of statically provisioned tunnels which do not provide any kind of statistical multiplexing gains.

Each VPN site is connected by a link 12 to an edge PNE which is provisioned, in step 182, with a separate routing instance, and the abstracted network map. A correspondence table that relates the abstract network map with the PNEs may also be used to facilitate routing.

The invention has therefore been described in relation to a method for computing metric information for abstracted links in an abstracted network map, and to a method for providing metric information to a client network, so that the client network can use an abstracted network map for route planning.

The embodiments of the invention described above are intended to be exemplary only. The scope of the invention is therefore intended to be limited solely by the scope of the appended claims.

We claim:

1. A method for assigning metric information to an abstracted network map comprising a set of abstracted links interconnecting respective pairs of nodes, each node representing a corresponding Network Element (NE) of an underlying network having a plurality of NEs interconnected by physical links, the method comprising:

computing each available route through the underlying network between a first NE represented by a node of the abstracted network map and each of the other NE's represented by corresponding nodes in the abstracted network map;

selecting, for each pair of NE's represented by nodes in the abstracted network map, an optimal one of the computed available routes based on local resource availability information related to the physical links in the underlying network; and for each abstracted link of the abstracted network map, assigning to the abstracted link respective resource availability information of the optimal route between the NE's represented by the respective nodes of the abstracted link;

wherein selecting an optimal route comprises constructing a tree to span a graph of the data transport network, the tree being rooted at a root node of the graph representing the first NE and being iteratively expanded so that paths from the root node to other nodes in the tree correspond to routes of optimal resource availability with respect to the local resource availability information.

2. The method as claimed in claim 1 wherein the route is optimized first for a primary availability parameter, and second for a secondary availability parameter.

3. The method as claimed in claim 1 further comprising determining whether the resource availability information associated with the selected optimal route is relevant to an abstracted link in the abstracted network map.

4. The method as claimed in claim 1, wherein assigning respective resource availability information of the optimal route to the abstracted link comprises transforming the resource availability information of the optimal route into corresponding metric information for use by a client network element (CNE).

5. The method as claimed in claim 4 wherein transforming the resource availability information of the abstracted link comprises formulating a metric information update message to be sent to the CNE, the metric information update message including resource availability information in units and in a format expected by the CNE.

6. The method as claimed in claim 4 wherein the respective resource availability information assigned to the abstracted link comprises a predefined fraction of the total resource availability of the selected optimal route, in order to offer a percentage of the available bandwidth to the client network element.

7. The method as claimed in claim 5 wherein the first NE is an edge NE of a data transport network tat is connected by a link to the CNE and is represented by a node of the abstracted network map, and wherein the method further comprises:

monitoring physical links in the underlying network adjacent to the edge NE to identify changes to resource availability of local physical links, and exchanging resource availability information with other NEs of the underlying network, in order to maintain resource availability information for all physical links in the underlying network;

the resource availability information being used to compute optimal routes between the edge NE and the other NEs represented by nodes in the abstracted network map.

8. A method for computing metric information for an abstracted link of an abstracted network map comprising a set of abstracted links interconnecting respective pairs of nodes, each node representing a corresponding Network Element (NE) of an underlying network having a plurality of NEs interconnected by physical links, the method comprising:

maintaining resource availability information regarding respective physical links of an underlying network at a first network element (NE) represented by a node in die abstracted network map;

using the resource availability information to construct a spanning tree rooted at a root node representing the first NE, the tree being constructed by:

iteratively expanding the tree to include a node adjacent to a node in the tree when a path from the root to the adjacent node corresponds to a route of optimal resource availability over physical links between the NE and a second NE represented by the adjacent node, among all of the paths from the root node to nodes not in the tree; and for each abstracted link of the abstracted network map, assigning to the abstracted link respective resource availability information of the optimal route between the NE's represented by the respective nodes of the abstracted link.

9. The method as claimed in claim 8 wherein constructing the tree comprises constructing the tree so that each path in the tree from the root is optimized first for a primary resource availability parameter, and secondly for a secondary resource availability parameter.

10. The method as claimed in claim 8 further comprising transforming the resource availability information of the optimal paths between NEs of the abstracted network map into metric information for a related abstracted link, and forwarding the metric information to a client network element (CNE).

11. The method as claimed in claim 8 further comprising:

receiving a change in resource availability information relating to a physical link;

determining if the changed resource availability information might change an optimal path between the root node and a node representing another NE in the abstracted network map, and if so, re-constructing the spanning tree using the changed resource availability information.

12. The method as claimed in claim 8 wherein constructing the spanning tree comprises:

updating temporary labels of sill of the NEs adjacent to permanently labeled NEs of the spanning tree with labels that include a path, a cost of the path and a bandwidth availability associated with the path;

making permanent a temporary label having a highest bandwidth availability, and having a lowest cost among the labels with the highest bandwidth availability; and repeating the updating and making permanent until all of the NEs in the data transport network are permanently labeled.

13. The method as claimed in claim 8 wherein maintaining resource availability information comprises:
monitoring resource availability of local physical links that are adjacent to the NE;
exchanging changes in the resource availability of physical links with the other NEs of the underlying network; and
storing current resource availability information relating to each physical link of the underlying network in a link state database.

14. A network element (NE) of a data transport network, the NE being represented as a node in an abstracted network map comprising a set of abstracted links interconnecting respective pairs of nodes, each node representing a respective network element of the data transport network, the NE comprising:
a memory for storing a link state database including resource availability information relating to physical links in the data transport network; and
a processor for:
constructing a spanning tree rooted at a root nice representing the NE using the resource availability information, by iteratively expanding the tree to include a node adjacent to a node in the tree when a pat from the root to the adjacent node corresponds to a mute of optimal resource availability over physical links between the NE and a second NE represented by the adjacent node, among all of the paths from the root node to nodes not in the tree; and
for each abstracted link of the abstracted network map, assigning to the abstracted link respective resource availability information of the optimal route between the NE's represented by the respective nodes of the abstracted link.

15. The NE as claimed in claim 14 wherein the processor iteratively expands the tree by identifying a path that is optimized for both a primary availability parameter, and a secondary availability parameter.

16. The NE as claimed in claim 15 wherein the processor is operative under program instructions for:
updating temporary labels of all nodes adjacent to a permanently labeled node of the spanning tree with labels that include a path, a cost of the pat and a bandwidth availability associated with the path;
making permanent a temporary label having a highest bandwidth availability, and having a lowest cost among the labels with the highest bandwidth availability; and
repeating the steps of updating labels and making labels pennanent until all of the nodes representing NEs in the abstracted network map are permanently labeled.

17. The NE as claimed in claim 14 further comprising a network control signaling system for exchanging changes in resource availability information relating to physical links in the data transport network with the other NEs of the data transport network, and for exchanging the resource availability information of the optimal routes between a first NE represented by a node of the abstracted network map with each of the other NEs represented by a node in the abstracted network map.

18. The NE as claimed in claim 17 wherein the NE is an edge NE connected by a link to a client network element (CNE) tat uses te abstracted network map, and further comprises:
program instructions for transforming the resource availability information of an abstracted link into corresponding metric information; and
wherein the network control signaling system is adapted to send the metric information to the CNE.

19. The NE as claimed in claim 18 wherein the program instructions for transforming the resource availability information comprises program instructions for formulating a metric information update message to be sent to the client network element (CNE), the metric information update message including resource availability information in units and in a format expected by the CNE.

20. The NE as claimed in claim 19 wherein the program instructions for transforming the resource availability information comprises program instructions for calculating a predefined fraction of the resource availability of the optimal route associated with the abstracted link, in order to offer a percentage of the available bandwidth to the CNE.

* * * * *